(12) United States Patent
Wang et al.

(10) Patent No.: US 9,372,367 B2
(45) Date of Patent: *Jun. 21, 2016

(54) SYSTEM FOR DISPLAY IMAGES

(71) Applicants: INNOCOM TECHNOLOGY(SHENZHEN) CO., LTD., Longhua Town, Bao An District, Shenzhen, Guangdong Province (CN); InnoLux Corporation, Miao-Li County (TW)

(72) Inventors: Chun-Ming Wang, Miao-Li County (TW); Hsixg-Ju Sung, Miao-Li County (TW); Te-Yu Lee, Miao-Li County (TW)

(73) Assignees: INNOCOM TECHNOLOGY(SHENZHEN) CO., LTD, Longhua Town, Shenzhen (CN); INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,919

(22) Filed: Oct. 5, 2015

(65) Prior Publication Data

US 2016/0026020 A1   Jan. 28, 2016

Related U.S. Application Data

(60) Continuation of application No. 14/714,560, filed on May 18, 2015, now Pat. No. 9,176,345, which is a division of application No. 13/535,249, filed on Jun. 27, 2012, now abandoned.

(30) Foreign Application Priority Data

Jun. 29, 2011   (TW) ............................. 100122869 A

(51) Int. Cl.
*G02F 1/1339* (2006.01)
*G02F 1/1341* (2006.01)
(Continued)

(52) U.S. Cl.
CPC ............ *G02F 1/1339* (2013.01); *G02F 1/1341* (2013.01); *G02F 1/13306* (2013.01); *G02F 1/133345* (2013.01); *G02F 2001/133357* (2013.01)

(58) Field of Classification Search
CPC ...................................................... G02F 1/1339
See application file for complete search history.

(56) References Cited

U.S. PATENT DOCUMENTS

| 6,982,779 B2 * | 1/2006 | Park | ...................... | G02F 1/1339 349/153 |
| 7,515,241 B2 * | 4/2009 | Kim | ...................... | G02F 1/1339 349/153 |

(Continued)

FOREIGN PATENT DOCUMENTS

| CN | 1560689 | 1/2005 |
| TW | 200844613 | 11/2008 |

(Continued)

OTHER PUBLICATIONS

Taiwanese language office action dated Jan. 3, 2014.
(Continued)

*Primary Examiner* — Timothy L Rude
(74) *Attorney, Agent, or Firm* — McClure, Qualey & Rodack, LLP

(57) ABSTRACT

A system for displaying images including a display panel is provided. The display panel has a display area and a peripheral area. The display panel includes a metal layer disposed on a first substrate. A patterned planarization layer is disposed on the metal layer, having at least one opening corresponding to the peripheral area, wherein a portion of the metal layer is disposed in the opening. A second substrate is disposed opposite to the first substrate. A seal is disposed at the peripheral area and between the first and the second substrates, wherein the seal covers the metal layer through the opening of the patterned planarization layer. A passivation layer disposed on the portion of the metal layer and covering a sidewall of the patterned planarization layer to form a first passivation sidewall, wherein the seal is in contact with the first passivation sidewall.

18 Claims, 5 Drawing Sheets

(51) Int. Cl.
*G02F 1/133* (2006.01)
*G02F 1/1333* (2006.01)

(56) References Cited

U.S. PATENT DOCUMENTS

| | | | |
|---|---|---|---|
| 7,528,921 B2 * | 5/2009 | Ahn | G02F 1/13394 349/149 |
| 8,237,904 B2 | 8/2012 | Chen et al. | |
| 2010/0002182 A1 | 1/2010 | Lee et al. | |
| 2011/0043734 A1 | 2/2011 | Chang | |
| 2014/0176895 A1 | 6/2014 | Park | |
| 2014/0320789 A1 | 10/2014 | Son et al. | |
| 2015/0346556 A1 * | 12/2015 | Hirota | G02F 1/1339 349/43 |

FOREIGN PATENT DOCUMENTS

| | | |
|---|---|---|
| TW | 201009432 | 3/2010 |
| TW | 20110272 | 1/2011 |

OTHER PUBLICATIONS

Chinese language office action dated Jul. 3, 2014.
Taiwanese language office action dated Aug. 5, 2014.

* cited by examiner

SYSTEM FOR DISPLAY IMAGES

CROSS REFERENCE TO RELATED APPLICATIONS

This application is a Continuation of pending U.S. patent application Ser. No. 14/714,560, filed May 18, 2015 and entitled "SYSTEM FOR DISPLAY IMAGES", which is Divisional of pending U.S. patent application Ser. No. 13/535,249, filed Jun. 27, 2012 and entitled "SYSTEM FOR DISPLAY IMAGES", which claims priority of Taiwan Patent Application No. 100122869, filed on Jun. 29, 2011, the entirety of which is incorporated by reference herein.

BACKGROUND

1. Field of the Invention

The disclosure relates to a system for displaying images including a display panel, and more particularly to a display panel with a patterned planarization layer.

2. Description of the Related Art

Generally, a color filter (CF) substrate and an array substrate are bonded together by a seal. Then, a space between the two substrates is filled with a liquid crystal material to form a liquid crystal display panel.

In conventional liquid crystal display panels, after a plurality of thin-film transistors (TFTs) and a plurality of scan lines and data lines are formed on the array substrate, a planarization layer is blanketly formed over the array substrate to cover the TFTs, the scan lines, and the data lines. The adhesion between a material of the planarization layer and a metal material used for the scan lines and the data lines and the adhesion between a material of the planarization layer and an inorganic material used for the TFTs, such as silicon oxide or silicon nitride are poor. Thus, peeling easily occurs between the planarization layer and the metal lines of the scan lines and the data lines, and between the planarization layer and the inorganic material of the TFTs. If so, then, there is poor bonding between the CF substrate and the array substrate, which may lead to the separation of the CF substrate and the array substrate. Therefore, the yield of the conventional liquid crystal display panels is poor.

SUMMARY

Accordingly, embodiments of the invention provide a system for displaying images including a display panel. The display panel has a patterned planarization layer which improves a bonding force between two substrates of the display panel. Thus, the peeling issue found in the manufacturing of conventional liquid crystal display panels is prevented from occurring. Further, the yield of the liquid crystal display panels is enhanced.

According to an embodiment, a system for displaying images including a display panel is provided. The display panel has a display area and a peripheral area. The display panel includes a metal layer disposed on a first substrate. A patterned planarization layer is disposed on the metal layer, having at least one opening corresponding to the peripheral area, wherein a portion of the metal layer is disposed in the opening. A second substrate is disposed opposite to the first substrate. A seal is disposed at the peripheral area and between the first and the second substrates, wherein the seal covers the metal layer through the opening of the patterned planarization layer. A passivation layer disposed on the portion of the metal layer and covering a sidewall of the patterned planarization layer to form a first passivation sidewall, wherein the seal is in contact with the first passivation sidewall.

A detailed description is given in the following embodiments with reference to the accompanying drawings.

BRIEF DESCRIPTION OF THE DRAWINGS

The disclosure can be more fully understood by reading the subsequent detailed description and examples with reference to the accompanying drawings, wherein.

DETAILED DESCRIPTION

The description is provided for illustrating the general principles of the invention and is not meant to be limiting. The scope of the invention is best determined by reference to the appended claims.

In embodiments of the invention, a patterned planarization layer is formed on a substrate of a display panel. The patterned planarization layer is disposed between a seal and a metal layer and an insulating layer formed on the substrate. A contact area between the seal and the metal layer and the insulating layer is increased through the design of the patterned planarization layer. Thus, a bonding force between two substrates of the display panel is enhanced to prevent the peeling issue found in the manufacturing of conventional liquid crystal display panels from occurring.

Figure 1A:
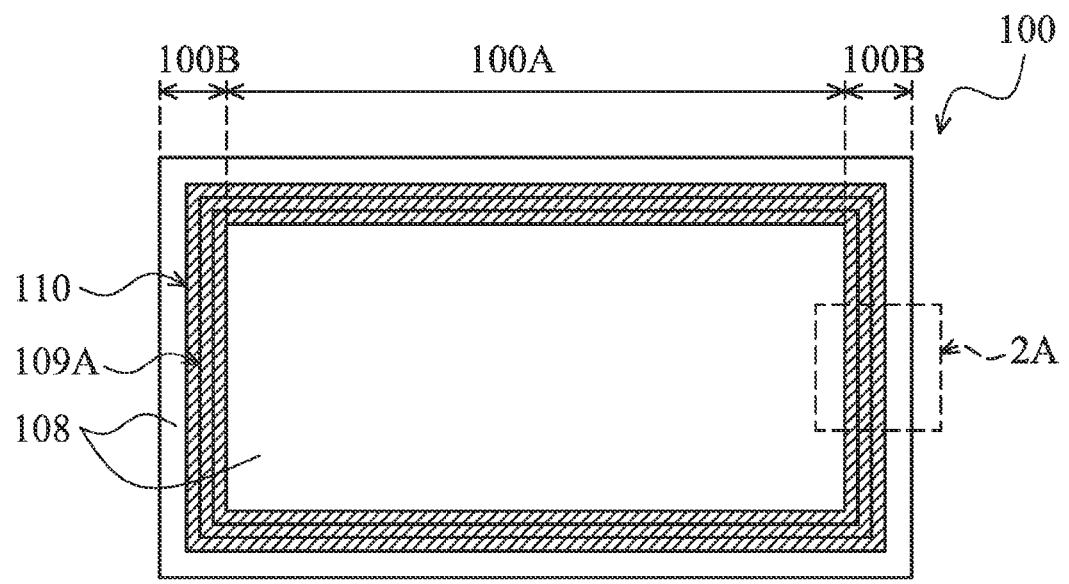
FIGS. 1A-1E show schematic plane views of display panels according to various embodiments of the invention.

Referring to FIG. 1A, a plane view of a display panel 100 according to an embodiment of the invention is shown. The display panel 100 has a display area 100A and a peripheral area 100B surrounding the display area 100A. A seal 110 is disposed at the peripheral area 100B for bonding two substrates (not shown) of the display panel 100 together. Furthermore, the display panel 100 has a patterned planarization layer 108, which has a loop-shaped opening 109A disposed corresponding to the peripheral area 100B. Moreover, the loop-shaped opening 109A is disposed corresponding to an area of the seal 110.

Figure 2A:
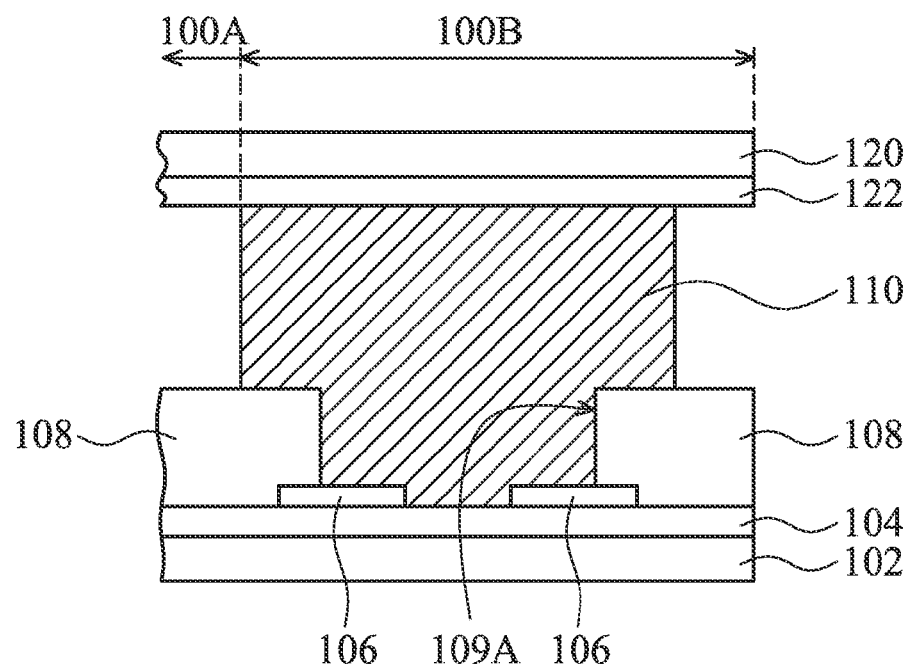
FIG. 2A shows a cross section of a portion of the display panel at the dotted line area 2A of FIG. 1A according to an embodiment of the invention.

Referring to FIG. 2A, a cross section of a portion of the display panel 100 at the dotted line area 2A of FIG. 1A according to an embodiment of the invention is shown. As shown in FIG. 2A, the display panel 100 includes a first substrate 102, such as an array substrate. An insulating layer 104 and a metal layer 106 are formed on the first substrate 102. The material of the insulating layer 104 is for example silicon oxide (SiOx), silicon nitride (SiNx) or a combination thereof, which may be used for an insulating material layer of TFTs. The material of the metal layer 106 may be an electrically conductive material such as titanium, aluminum, molybdenum, manganese, copper, zinc, tin, gold or silver, which can be used as metal wires for the scan lines and the data lines to electrically connect with the TFTs. The patterned planarization layer 108 is formed on the insulating layer 104 and the metal layer 106, having the loop-shaped opening 109A to expose a portion of the insulating layer 104 and a portion of the metal layer 106. The material of the patterned planarization layer 108 is for example an organic photoresist made of acrylic-based materials, which can be processed by an exposure and a development process to form the loop-shaped opening 109A.

The display panel 100 further includes a second substrate 120, such as a CF substrate, which is disposed opposite to the first substrate 102. A color filter layer 122 is formed on the second substrate 120. The seal 110 is disposed between the first substrate 102 and the second substrate 120 for bonding with each other. The material of the seal 110 is for example an adhesion agent made of acrylic-based materials or epoxy resin, which can be processed by a coating process to form the seal 110.

According to the characteristics of the materials of the seal 110, the insulating layer 104, the metal layer 106 and the patterned planarization layer 108, the adhesion force between the seal 110, the insulating layer 104 and the metal layer 106 is greater than the adhesion force between the patterned planarization layer 108, the insulating layer 104 and the metal layer 106. In an embodiment, using the design of the loop-shaped opening 109A of the patterned planarization layer 108, the seal 110 contacts the portions of the insulating layer 104 and the metal layer 106 exposed through the loop-shaped opening 109A. Thus, bonding ability between the first substrate 102 and the second substrate 120 is enhanced. In an embodiment, the area of the opening of the patterned planarization layer 108 may be 5% to 100% of the area of the seal 110, wherein at least greater than 10% is preferred. The area of the opening of the patterned planarization layer 108 is larger, and thus a contact area among the seal 110, the insulating layer 104 and the metal layer 106 on the first substrate 102 is larger. Therefore, the bonding ability between the first substrate 102 and the second substrate 120 is higher.

Figure 1B:
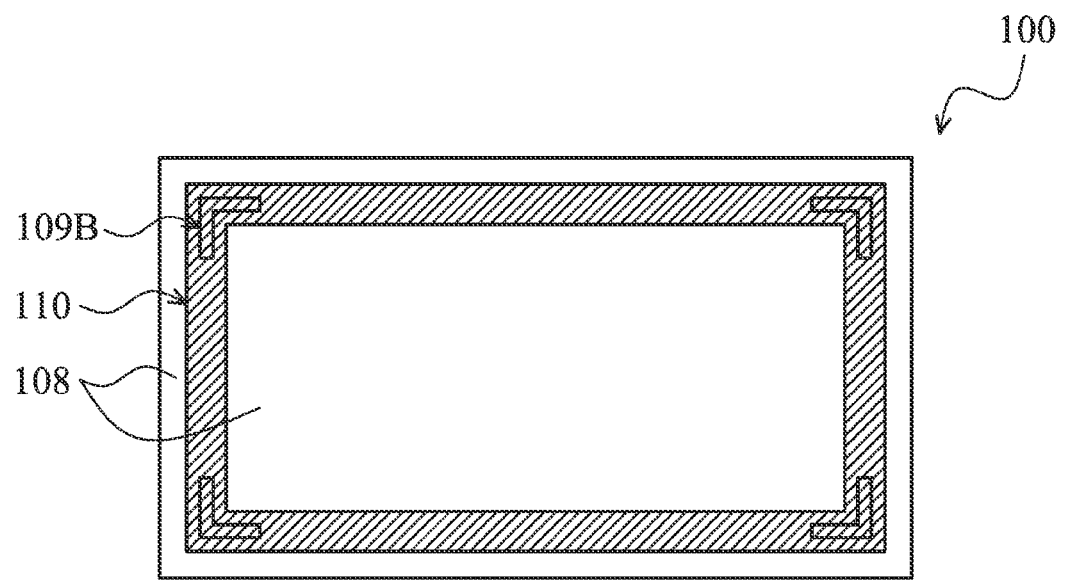

Referring to FIG. 1B, a plane view of a display panel 100 according to another embodiment of the invention is shown. In this embodiment, the patterned planarization layer 108 has L-shaped holes 109B disposed at four corners of the peripheral area 100B of the display panel 100 and the L-shaped holes 109B correspond to the area of the seal 110. A contact area among the seal 110, the insulating layer 104 and the metal layer 106 is increased by the design of the L-shaped holes 109B. The peeling issue easily occurs at the four corners of the display panel 100 when stress is applied to the display panel 100. Thus, when a shock test is performed to the display panel 100, the design of the four L-shaped holes 109B of the patterned planarization layer 108 prevents the display panel 100 from failing in the shock test due to peeling.

Figure 1C:
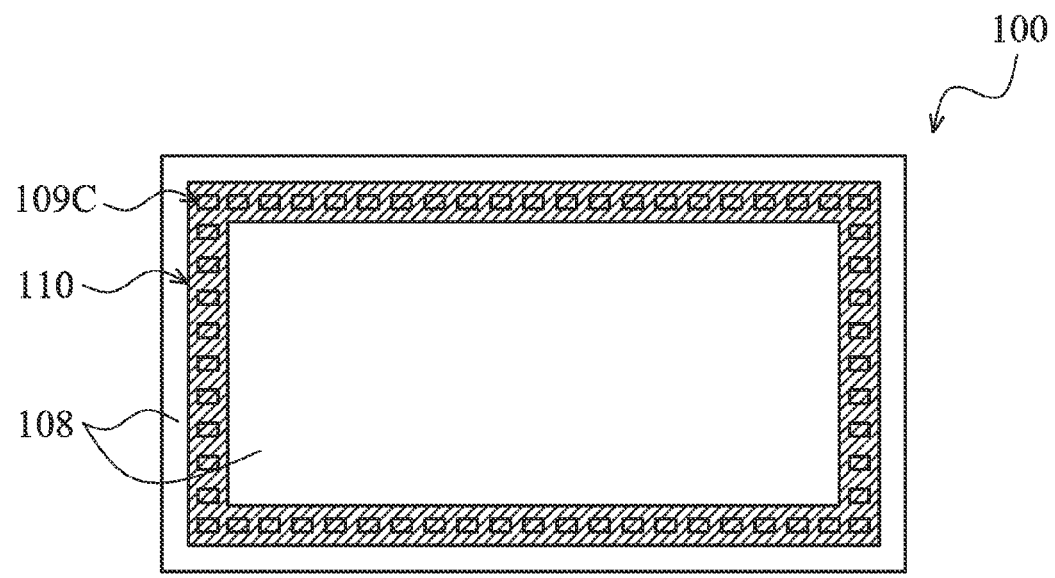

Referring to FIG. 1C, a plane view of a display panel 100 according to further another embodiment of the invention is shown. In this embodiment, the patterned planarization layer 108 has a plurality of holes 109C disposed at the peripheral area 100B of the display panel 100 and the holes 109C correspond to the area of the seal 110. A contact area among the seal 110, the insulating layer 104 and the metal layer 106 is increased by the design of the holes 109C. In the embodiments, the shape of the holes 109C may be any shape. Further, the amount, the size and the distribution position of the holes 109C are not limited to FIG. 1C. The area of the holes 109C is at least more than 10% of the area of the seal 110.

Figure 1D:
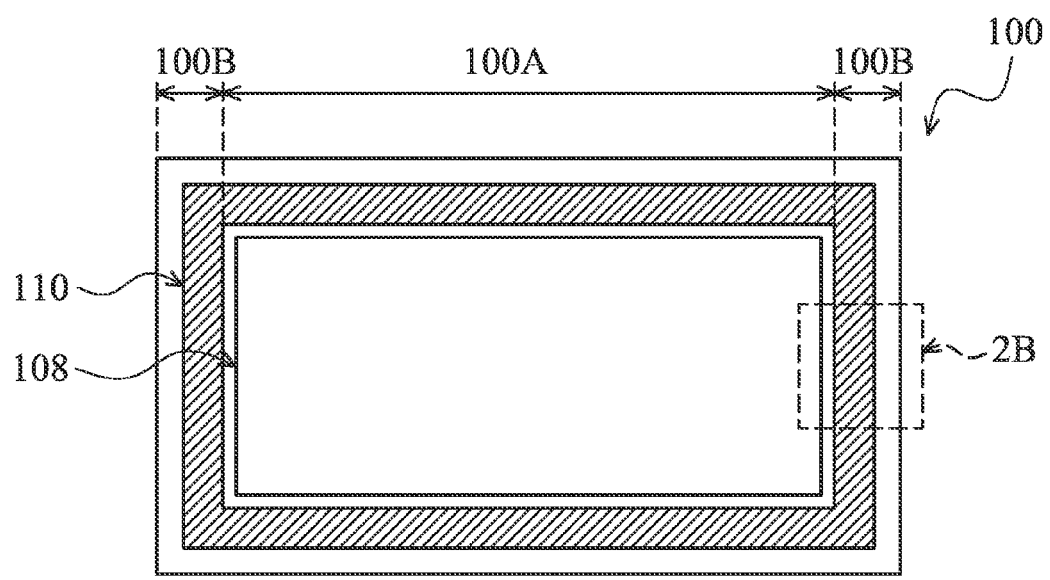

Referring to FIG. 1D, a plane view of a display panel 100 according to another embodiment of the invention is shown. In this embodiment, the patterned planarization layer 108 is disposed outside of the seal 110 and at the display area 100A.

The patterned planarization layer 108 is not disposed at the peripheral area 100B, such that the seal 110 completely covers the insulating layer 104 and the metal layer 106 at the peripheral area 100B to enhance the bonding strength between the first substrate 102 and the second substrate 120.

Figure 2B:
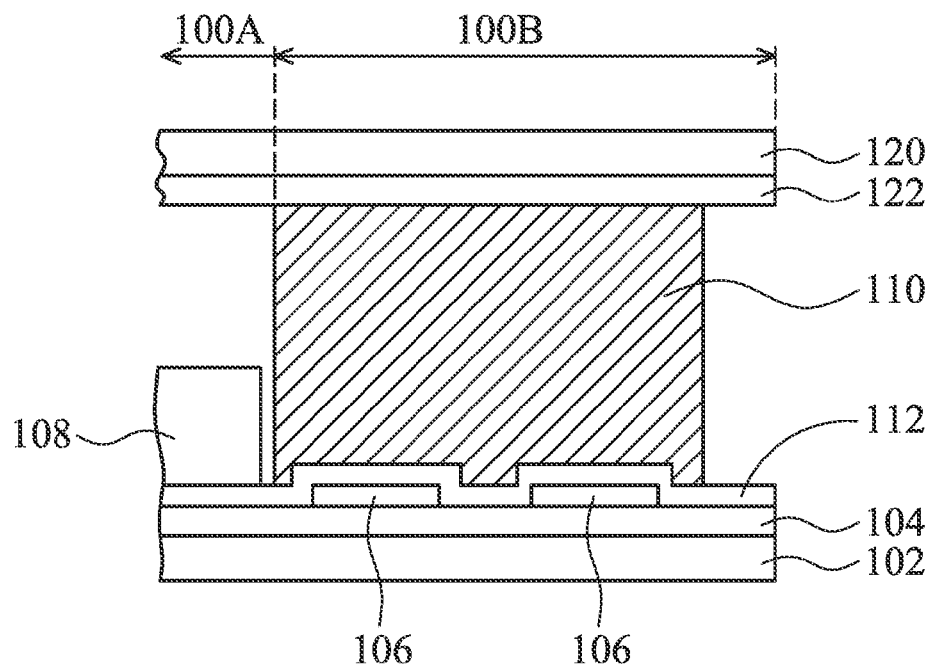
FIG. 2B shows a cross section of a portion of the display panel at the dotted line area 2B of FIG. 1D according to an embodiment of the invention.

Referring to FIG. 2B, a cross section of a portion of the display panel 100 at the dotted line area 2B of FIG. 1D according to an embodiment of the invention is shown. As compared with the display panel of FIG. 2A, the display panel 100 of FIG. 2B further includes a passivation layer 112 disposed between the patterned planarization layer 108 and the insulating layer 104 and the metal layer 106. Because the patterned planarization layer 108 of the display panel 100 of FIG. 2B is only disposed at the display area 100A, the metal layer 106 may be corroded by moisture or oxygen before coating the seal 110. After coating the seal 110, the metal layer 106 also may be corroded due to the seal 110 not being accurately coated at an exact position and the metal layer 106 not completely being covered with the seal 110. In order to overcome the above mentioned problems, in this embodiment, the passivation layer 112 is formed on the metal layer 106 to completely cover the insulating layer 104 and the metal layer 106. The material of the passivation layer 112 may be silicon oxide (SiOx), silicon nitride (SiNx) or other suitable insulating materials. According to the characteristics of the materials of the seal 110, the passivation layer 112 and the patterned planarization layer 108, the adhesion force between the seal 110 and the passivation layer 112 is greater than the adhesion force between patterned planarization layer 108 and the passivation layer 112. Thus, the peeling issue occurring between the first substrate 102 and the second substrate 120 is effectively prevented.

Figure 1E:
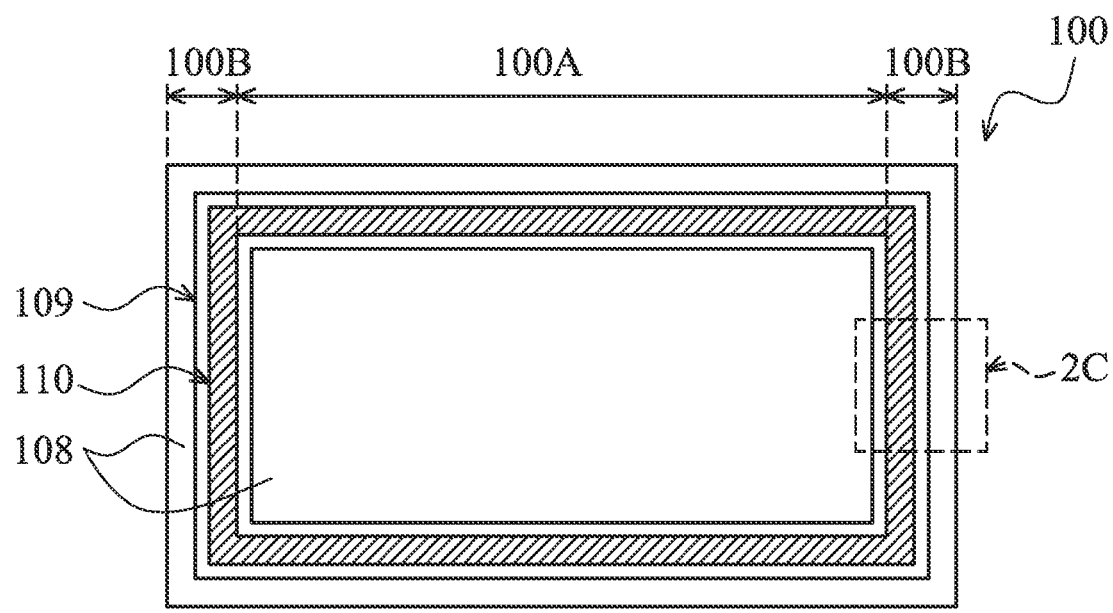

Referring to FIG. 1E, a plane view of a display panel 100 according to another embodiment of the invention is shown. In this embodiment, an opening 109 of the patterned planarization layer 108 has an area greater than or equal to the area of the seal 110. Therefore, the seal 110 completely covers portions of the insulating layer 104 and the metal layer 106 exposed by the opening 109 to enhance the bonding strength between the first substrate 102 and the second substrate 120.

Figure 2C:
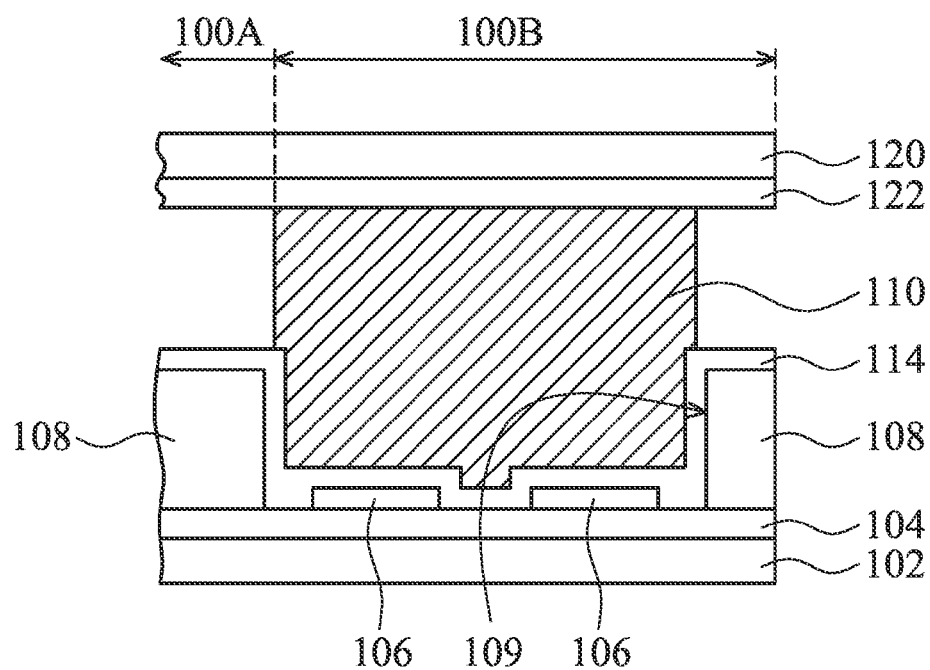
FIG. 2C shows a cross section of a portion of the display panel at the dotted line area 2C of FIG. 1E according to an embodiment of the invention.

Referring to FIG. 2C, a cross section of a portion of the display panel 100 at the dotted line area 2C of FIG. 1E according to an embodiment of the invention is shown. As compared with the display panel of FIG. 2A, the display panel 100 of FIG. 2C further includes a passivation layer 114 disposed above the patterned planarization layer 108. The portions of the insulating layer 104 and the metal layer 106 exposed by the opening 109 are completely covered with the passivation layer 114. The material of the passivation layer 114 may be silicon oxide (SiOx), silicon nitride (SiNx) or other suitable insulating materials. According to the characteristics of the materials of the seal 110, the passivation layer 114 and the patterned planarization layer 108, the adhesion force between the seal 110 and the passivation layer 114 is greater than the adhesion force between patterned planarization layer 108 and the passivation layer 114. Thus, the peeling issue occurring between the first substrate 102 and the second substrate 120 is effectively prevented. Moreover, before coating the seal 110, the passivation layer 114 prevents the metal layer 106 from being corroded by moisture or oxygen. After coating the seal 110, the metal layer 106 may be corroded due to the seal 110 not being accurately coated at an exact position and the metal layer 106 not being completely covered by the seal 110. However, the passivation layer 114 mitigates the above mentioned issues to prevent the metal layer 106 from corrosion.

As the above mentions, the display panels 100 of the embodiments use the design of the patterned planarization layer 108 to increase the contact area between the seal 110 and the insulating layer 104 and the metal layer 106 on the first substrate 102, or to increase the contact area between the seal 110 and the passivation layer 112 or 114 on the first substrate 102. Therefore, the bonding force between first substrate 102 and the second substrate 120 is enhanced to prevent the display panel 100 from failure which is caused by peeling issue. Moreover, the production yield of the display panel 100 is also enhanced.

In an embodiment of the display panel 100, a liquid crystal layer (not shown) is sandwiched between the first substrate 102 and the second substrate 120. Moreover, the display panel 100 can further include a pair of polarizers (not shown) disposed on the outer sides of the first substrate 102 and the second substrate 120 respectively to complete the fabrication of a liquid crystal display panel.

Figure 3:
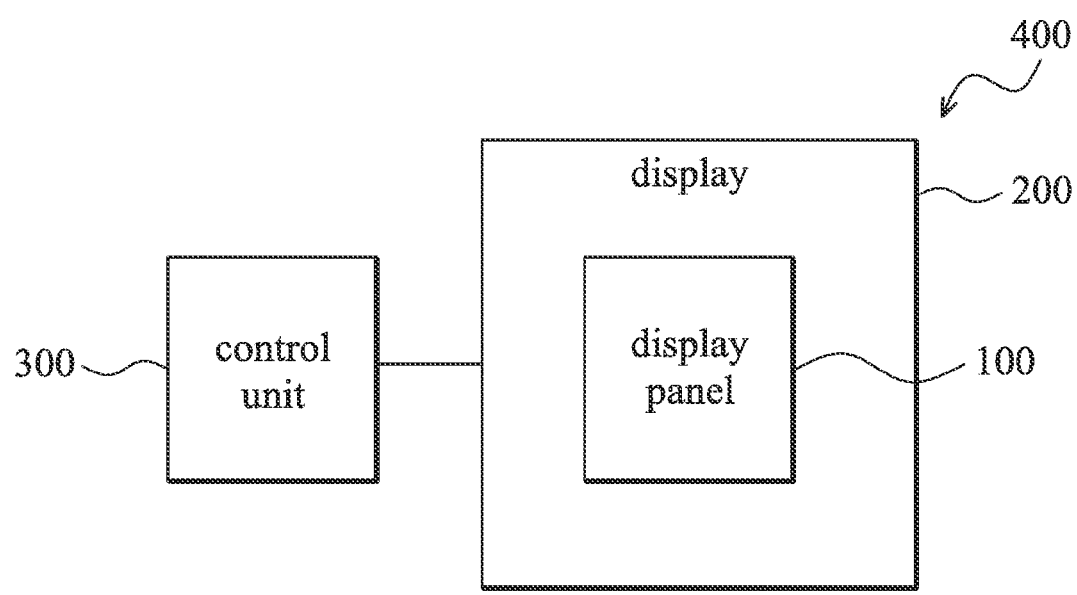
FIG. 3 schematically shows a system for displaying images including the display panel according to an embodiment of the invention.

Referring to FIG. 3, a system 400 for displaying images according to an embodiment of the invention is shown. The system 400 for displaying images includes a display 200, for example a liquid crystal display. The display 200 includes a display panel 100 according to an embodiment of the invention. The display 200 can be a part of an electronic device. In general, the system 400 for displaying images includes the display 200 and a control unit 300. The control unit 300 is coupled with the display 200 to provide an input to the display 200, such that the display 200 displays images. The above mentioned electronic device can be a mobile phone, a digital camera, a personal data assistant (PDA), a notebook computer, a desktop computer, a television, a car display or a portable DVD player.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, including a display panel, having a display area and a peripheral area out of the display area, wherein the display panel comprises:
   a first substrate;
   a metal layer disposed on the first substrate;
   a patterned planarization layer disposed on the first substrate, having at least one opening corresponding to the peripheral area, wherein a portion of the metal layer is disposed in the opening;
   a second substrate disposed opposite to the first substrate;
   a seal disposed between the first substrate and the second substrate and disposed at the peripheral area, wherein the seal covers the metal layer through the opening of the patterned planarization layer; and
   a passivation layer disposed on the portion of the metal layer and covering a sidewall of the patterned planarization layer to form a first passivation sidewall,
   wherein the seal is in contact with the first passivation sidewall.

2. The system as claimed in claim 1, wherein an area of the opening of the patterned planarization layer is 5% to 100% of an area of the seal.

3. The system as claimed in claim 1, wherein an area of the opening of the patterned planarization layer is above 10% of an area of the seal.

4. The system as claimed in claim 1, wherein the opening of the patterned planarization layer comprises a plurality of holes.

5. The system as claimed in claim 4, wherein the plurality of holes are disposed at corners of the peripheral area of the display panel.

6. The system as claimed in claim 1, wherein the material of the passivation layer comprises silicon nitride or silicon oxide.

7. The system as claimed in claim 1, further comprising an insulating layer disposed between the metal layer and the first substrate, wherein a portion of the insulating layer is exposed by the opening of the patterned planarization layer.

8. The system as claimed in claim 7, wherein the material of the patterned planarization layer comprises an organic photoresist and the material of the insulating layer comprises silicon nitride or silicon oxide.

9. The system as claimed in claim 1, wherein the passivation layer covers a sidewall of the metal layer to form a second passivation sidewall, and the seal is in contact with the second passivation sidewall.

10. An electronic device, comprising:
    a display, including a display panel having a display area and a peripheral area out of the display area, wherein the display panel comprises:
    a first substrate;
    a metal layer disposed on the first substrate;
    a patterned planarization layer disposed on the first substrate, having at least one opening corresponding to the peripheral area, wherein a portion of the metal layer is disposed in the opening;
    a second substrate disposed opposite to the first substrate;
    a seal disposed between the first substrate and the second substrate and disposed at the peripheral area, wherein the seal covers the metal layer through the opening of the patterned planarization layer; and
    a passivation layer disposed on the portion of the metal layer and covering a sidewall of the patterned planarization layer to form a first passivation sidewall,
    wherein the seal is in contact with the first passivation sidewall; and
    a control unit coupled to the display to provide an input data to the display such that the display displays images.

11. The electronic device as claimed in claim 10, wherein the passivation layer covers a sidewall of the metal layer to form a second passivation sidewall, and the seal is in contact with the second passivation sidewall.

12. The electronic device as claimed in claim 10, wherein an area of the opening of the patterned planarization layer is 5% to 100% of an area of the seal.

13. The electronic device as claimed in claim 10, wherein an area of the opening of the patterned planarization layer is above 10% of an area of the seal.

14. The electronic device as claimed in claim 10, wherein the opening of the patterned planarization layer comprises a plurality of holes.

15. The electronic device as claimed in claim 14, wherein the plurality of holes are disposed at corners of the peripheral area of the display panel.

16. The electronic device as claimed in claim 10, wherein the material of the passivation layer comprises silicon nitride or silicon oxide.

17. The electronic device as claimed in claim 10, further comprising an insulating layer disposed between the metal layer and the first substrate, wherein a portion of the insulating layer is exposed by the opening of the patterned planarization layer.

18. The electronic device as claimed in claim 17, wherein the material of the patterned planarization layer comprises an organic photoresist and the material of the insulating layer comprises silicon nitride or silicon oxide.

* * * * *